US006806514B1

United States Patent
Tian et al.

(10) Patent No.: US 6,806,514 B1
(45) Date of Patent: Oct. 19, 2004

(54) MODULAR DIGITAL PIXEL SENSOR SYSTEM

(75) Inventors: Hui Tian, Stanford, CA (US); Ricardo Motta, Palo Alto, CA (US)

(73) Assignee: PiXIM, Inc., Mountain View, CA (US)

( * ) Notice: Subject to any disclaimer, the term of this patent is extended or adjusted under 35 U.S.C. 154(b) by 11 days.

(21) Appl. No.: 09/999,730

(22) Filed: Oct. 24, 2001

(51) Int. Cl.⁷ .............................. H01L 27/10; H01L 3/14
(52) U.S. Cl. ...................... 257/202; 257/203; 257/204; 257/207; 257/208; 348/311; 348/312; 348/313; 348/314
(58) Field of Search ............................ 257/59, 72, 202, 257/203, 204, 207, 208, 723, 724; 348/311, 312, 313, 314, 362; 395/800; 364/221, 516; 382/278, 103; 302/294

(56) References Cited

U.S. PATENT DOCUMENTS

| 5,461,425 A | 10/1995 | Fowler et al. |
| 5,734,155 A | 3/1998 | Rostoker |
| 5,764,288 A | * 6/1998 | Gorelik ..................... 348/311 |
| 6,498,396 B1 | * 12/2002 | Arimoto ..................... 257/737 |
| 2002/0140842 A1 | * 10/2002 | Olding et al. ............... 348/362 |

OTHER PUBLICATIONS

"A 640x512 CMOS Image Sensor With Ultrawide Dynamic Range Floating–Point Pixel–Level ADC" by David X. D. Yang, Abbas El Gamal, Boyd Fowler, and Hui Tian; IEEE Journal of Solid–State Circuits, vol. 34, No. 12, Dec. 1999.

* cited by examiner

Primary Examiner—Minhloan Tran
Assistant Examiner—Tan Tran
(74) Attorney, Agent, or Firm—Steve Mendelsohn; Steven R. Petersen; Joe Zheng

(57) ABSTRACT

A digital pixel sensor-based modular digital imaging system includes several integrated circuit modules. At least one module includes an integrated circuit die having a digital pixel sensor array and a frame buffer, and at least one module includes an integrated circuit die having control circuitry and/or I/O circuitry. In certain embodiments all component modules are generally the same; in other embodiments the component modules include different integrated circuits that perform different functions. A higher pixel count imaging system may be made by disposing several component modules having lower pixel count digital pixel sensor arrays adjacent one another.

21 Claims, 3 Drawing Sheets

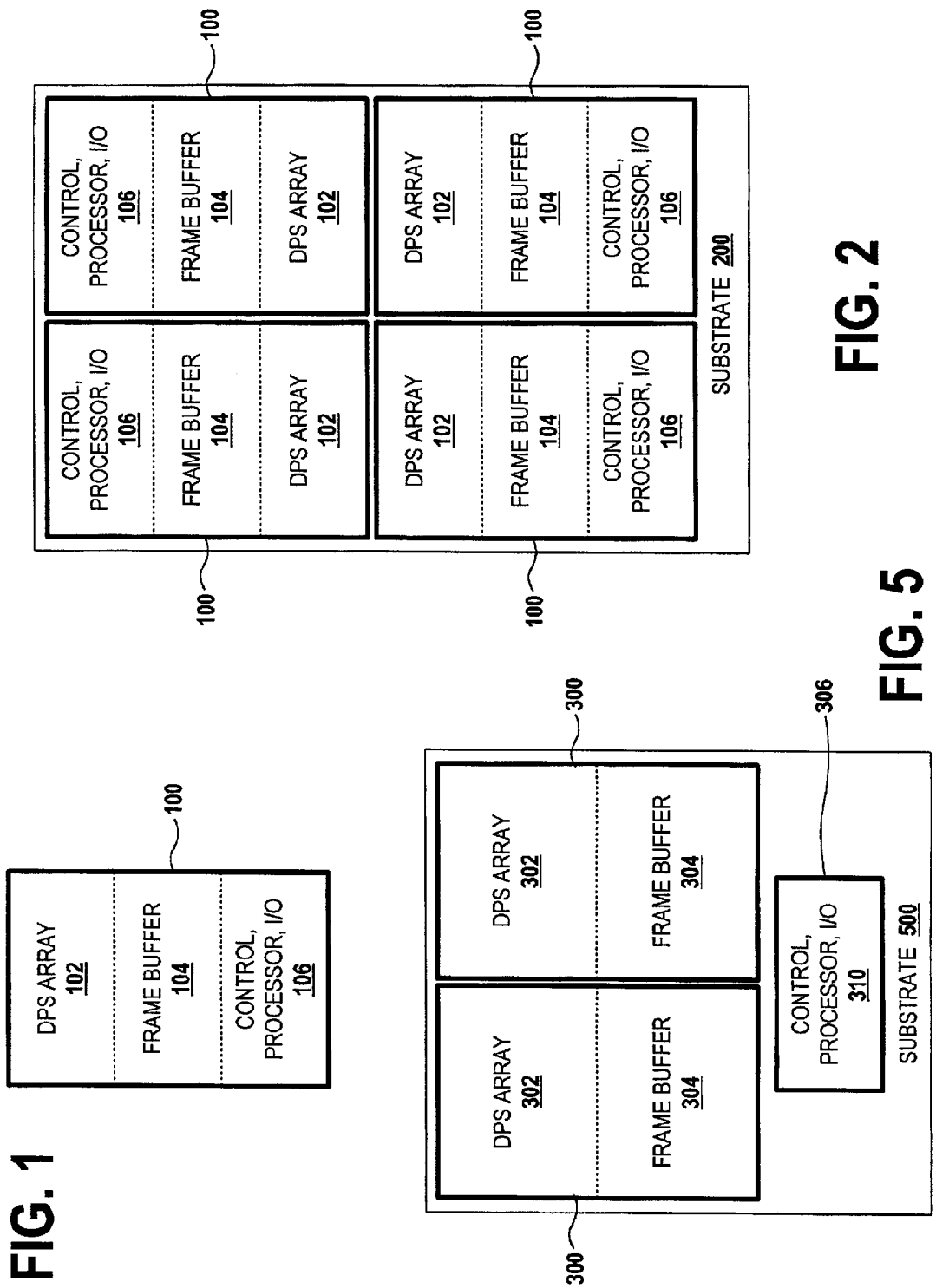

MODULAR DIGITAL PIXEL SENSOR SYSTEM

BACKGROUND OF THE INVENTION

Field of the Invention

This invention relates to digital imaging systems. More particularly, this invention relates to digital imaging systems having multiple modules, and to methods for making such systems.

DESCRIPTION OF THE RELATED ART

Solid state imaging systems are proliferating in a wide variety of imaging applications. Such systems have an array of photoresponsive elements fabricated in a semiconductor integrated circuit. The photoresponsive elements are disposed in a sensor array that typically is a rectangular grid. When the sensor array is exposed to an optical image, each photoresponsive element generates an analog electrical signal that is related to the amount of light striking it. Each such signal comprises a pixel of an electronic image corresponding to the optical image, and is usually subjected to further signal processing in an imaging application.

One type of solid state imaging system that has many advantages is a digital imaging system in which the signal processing circuitry associated with each photoresponsive element includes an analog-to-digital converter ("ADC") so as to produce a digital output signal that is responsive to the amount of light impinging on the photoresponsive element. An example of such a system is shown in U.S. Pat. No. 4,561,425, the contents of which are incorporated herein by this reference. In contrast to other digital imaging systems in which an ADC is time-shared among many photoresponsive elements, the digital imaging systems in which each photoresponsive element has its own ADC, or in which an ADC services only a few photoresponsive elements, require minimal handling of analog signals and enable more easily handled digital output signals to be provided for each pixel in the sensor array. Applicant refers to such systems as "digital pixel sensor" or "DPS" systems.

Other functional elements of a digital imaging system may include a memory for storing image data, i.e., a frame buffer; processing circuitry for processing acquired image data or stored image data; input/output ("I/O") circuitry for inputting control signals and outputting image data; and control circuitry for controlling the operation of the sensor array, frame buffer, processing circuitry, and/or I/O circuitry. Some or all of these ancillary functional elements may be implemented in integrated circuitry formed in the same semiconductor die as the sensor array. Thus, one integrated circuit can include a substantial portion of the electronic circuitry necessary to implement a digital imaging system. In imaging, as in many areas of electronics, advances in semiconductor integrated circuit technology permit, and usually foster, integration of more and more functions in a single die.

One factor affecting the quality of a digital imaging system is the number of pixels (the "pixel count") in the digital images it produces. If the surface area on a die devoted to each pixel remains constant, increasing the pixel count of an integrated circuit digital imaging system requires increasing the surface area of the die generally in proportion, at least in the area of the die containing the sensor array. Thus, for example, quadrupling the pixel count of a sensor array from 512×512 pixels to 1024×1024 pixels might require roughly doubling the linear dimensions and quadrupling the area of the die. However, die linear dimensions and areas cannot be increased without eventually encountering drawbacks or limits. For instance, there is a limit to the size of die that can be produced using commercially available stepper photolithography equipment due to its fixed, relatively small exposure field. Although it may be expected that future improvements in integrated circuit fabrication technology will permit fabricating larger dies with increased pixel counts, such future improvements will not change the fact that there will still be limits of possible or practical pixel count in a digital imaging system fabricated as a single die; they will merely change what the limits are.

SUMMARY OF THE INVENTION

In accordance with the present invention, a digital pixel sensor-based modular digital imaging system includes several integrated circuit component modules. In one embodiment, the present invention t: is an imaging apparatus comprising a plurality of component modules disposed in a fixed spatial relationship, wherein each of the component modules includes at least one integrated circuit die, one or more of the component modules includes an integrated circuit die having an array of digital pixel sensors and a frame buffer, and one or more of the component modules includes an integrated circuit die having f: control circuitry and/or input/output circuitry. In another embodiment, the present invention is method of making imaging apparatus comprising disposing a plurality of component modules in a fixed spatial relationship on a substrate, wherein each of the component modules includes at least one integrated circuit die, one or more of the component modules includes an integrated circuit die having an array of digital pixel sensors and a frame buffer, and one or more of the component modules includes an integrated circuit die having control circuitry and/or input/output circuitry.

These and other objects and features of the present invention are set forth in greater detail in the following description and the drawings.

BRIEF DESCRIPTION OF THE DRAWINGS

FIG. 1 is a schematic diagram of a digital pixel sensor-based imaging system implemented in an integrated circuit die.

FIG. 2 is a schematic diagram of a digital pixel sensor-based modular imaging system, the component modules of which comprise imaging systems of the type shown in FIG. 1.

FIG. 5 is a schematic diagram of another digital pixel sensor-based modular imaging system, the component modules of which comprise a plurality of integrated circuit dies having differing functions.

DETAILED DESCRIPTION

Figure 4:
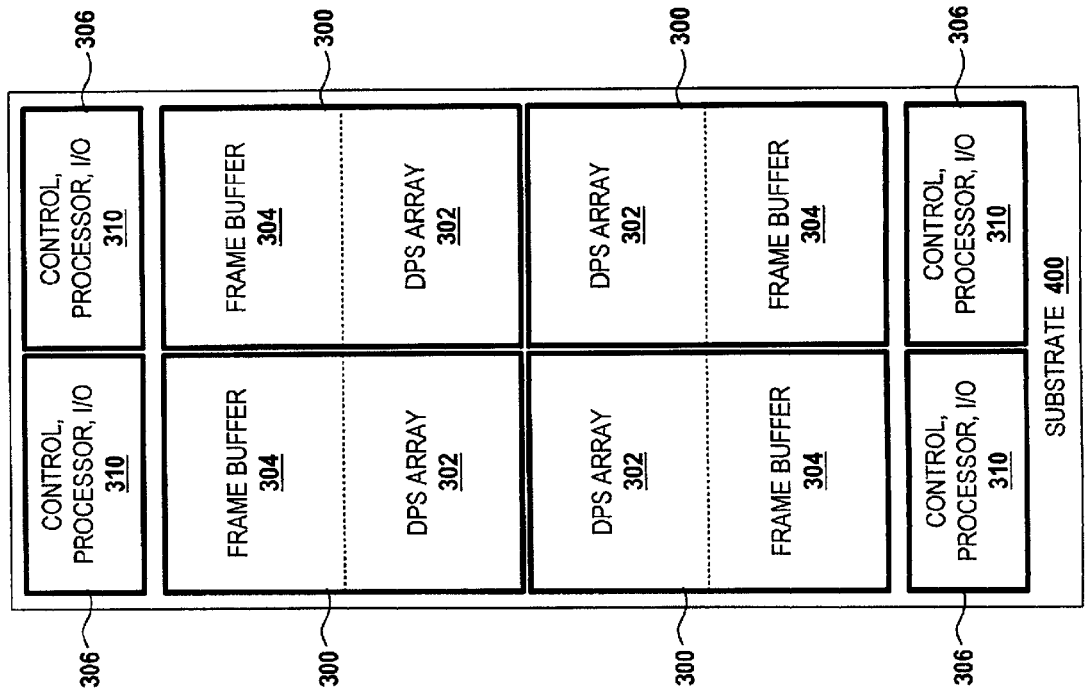
FIG. 4 is a schematic diagram of a digital pixel sensor-based modular imaging system, the component modules of which comprise imaging systems of the type shown in FIG. 3.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. The description herein is largely based on digital pixel sensor architecture. Those skilled in the art can appreciate that aspects of the description may also be applied to other image sensors.

FIG. 1 is a schematic diagram of a digital pixel sensor-based imaging system implemented in an integrated circuit die 100. The surface area of die 100 includes areas having circuitry implementing a digital pixel sensor (DPS) array 102, a frame buffer 104, and control, processor, and input/output (I/O) circuitry 106. DPS array 102 includes an array of photoresponsive elements and associated signal processing circuitry including ADC's to provide a digital signal for each photoresponsive element in the array. In all of the drawing figures, heavy lines represent edges of a die, while broken lines within a die represent the boundaries of circuitry performing different functions.

The inclusion of frame buffer 104 and control, processor, and I/O circuitry 106 reduces the area of die 100 that would otherwise be available for DPS array 102. The area of DPS array 102 constrains the imaging characteristics it can provide. If die 100 has the maximum area that can be produced using particular integrated circuit fabrication equipment, then the area devoted to frame buffer 104 and control, processor, and I/O circuitry 106 constrains the pixel count and the light-collecting area of the digital imaging system that can be produced using that fabrication equipment.

A die of the type shown in FIG. 1 provides a largely self-contained imaging system. In accordance with a first aspect of the present invention, dies of the type shown in FIG. 1 comprise modular components of an imaging system, and a plurality of such modular components are disposed adjacent one another to provide a modular imaging system having greater pixel count than its component modules. FIG. 2 illustrates an embodiment of this first aspect of the invention.

In FIG. 2, four imaging system dies 100 are disposed in a 2×2 array with their DPS arrays 102 adjacent one another to form a modular imaging system having four times the number of pixels of its component modules. The component module dies 100 are maintained in their relative positions by substrate 200. As used herein, a "substrate" is any device or structure which maintains a plurality of integrated circuits in a fixed spatial relationship to one another. Various types of device can be used as a substrate. For example, a plurality of dies 100 may be fabricated in a semiconductor wafer, and each of the dies 100 may be cut from the wafer and individually packaged to form a component module, and then four such component modules may be affixed to a printed circuit board or printed wiring board functioning as substrate 200 to form the modular imaging system of FIG. 2. Alternatively, substrate 200 may be the package backplate or other die-receiving surface of a multiple-die semiconductor package; a plurality of dies 100 may be fabricated in a semiconductor wafer, each of the dies 100 may be cut from the wafer to form a component module, and four such dies 100 may be affixed to such substrate 200 to form the modular imaging system of FIG. 2 and then packaged together. In a preferred embodiment, substrate 200 comprises a piece of semiconductor, such as a silicon wafer. All of the dies 100 are printed on and fabricated in the wafer, and a piece containing four dies 100 is cut from the wafer to form the modular imaging system of FIG. 2. Substrate 200 may include conductors to provide power to and interchange signals with dies 100, and may include other electronic components that operate in connection with the dies 100. In the descriptions of FIGS. 3–7 that follow, the nature of the substrates, the manner by which they maintain the component dies in a fixed spatial relationship, and the manner in which the dies may be fabricated, cut, packaged, and assembled to form a modular imaging system may be as described above with respect to FIG. 2.

In order for the sampled areas of the image to be uniformly spaced, the pixel row and column spacing should be uniform. To this end it is desirable to maintain the pixel row and column spacing substantially uniform across the boundaries between adjacent dies 100, so that the sum of the separation between adjacent dies and the distances between pixel edges and the edges of the dies is substantially equal to the separation between adjacent pixels within the dies. In such an arrangement the photoresponsive elements adjacent an edge of a die 100 must be located close to the die edge, and the edges of adjacent dies 100 must be located close to each other. Accordingly, the spacing shown in FIG. 2 between the dies 100 (as well as between other dies shown in other figures) is intended to aid the reader in identifying the different dies, and not to show such spacing to scale. Alternatively, uniform pixel spacing may be obtained by providing optics to direct light from adjacent areas of the object field being imaged to DPS arrays that do not maintain uniform pixel spacing across die boundaries.

Although the modular imaging system of FIG. 2 includes four dies 100, it should be understood that other numbers of component module dies 100 can be assembled into a modular imaging system in a similar manner. For instance, if only the upper left and upper right dies 100 were affixed to substrate 200 to provide a 1×2 die array, a modular imaging system would be formed with twice the pixel count of each component die 100. The 2×2 die array shown in FIG. 2 can also be extended to form, for instance, 2×3 or 2×4 die arrays with six and eight times the pixel count, respectively, of the component module dies 100. The modular imaging system of FIG. 2 is based on component modules comprising integrated circuits each having the same functions as the others; it may be implemented by a plurality of substantially identical integrated circuit dies.

Figure 3:
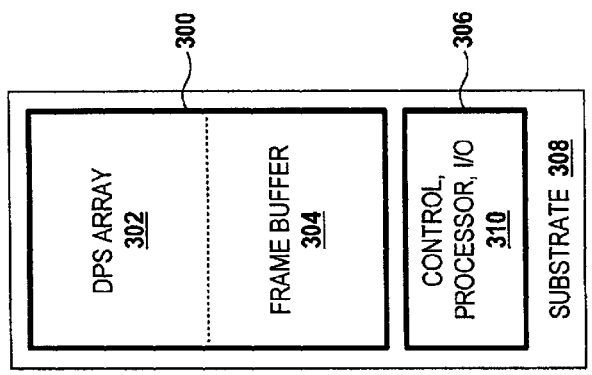
FIG. 3 is a schematic diagram of a digital pixel sensor-based modular imaging system, the component modules of which comprise a plurality of integrated circuit dies having differing functions.

The nature of digital pixel sensor-based imaging systems enables another way of increasing the pixel count of a digital imaging system. In accordance with a second aspect of the present invention, the component modules of a digital pixel sensor-based modular imaging system include several different integrated circuit dies, and a plurality of such modular components are disposed adjacent one another to a provide a modular imaging system. FIG. 3 illustrates an embodiment of this second aspect of the invention.

The modular imaging system of FIG. 3 includes two dies. A die 300 includes a DPS array 302 and a frame buffer 304. A die 306 includes control, processor, and I/O circuitry 310. Substrate 308 maintains dies 300 and 306 in their relative positions. By removing the control, processor, and I/O circuitry 310 from the die containing DPS array 302, more of the area on die 300 is available for DPS array 302 and a higher pixel count imaging system can be provided. An aspect of digital pixel sensor systems that facilitates partitioning imaging system functions in this fashion is that they provide digital image data in frame buffer 304 that can be communicated relatively easily and efficiently between frame buffer 304 and control, processor, and I/O circuitry 310. Thus, for instance, a 32-bit wide data bus can accommodate the data transmission for many imaging applications.

The modular imaging system of FIG. 3, comprising dies 300 and 306, can itself be used as a component module in a modular imaging system. In accordance with a third aspect of the present invention, modular imaging systems of the type shown in FIG. 3 are used as modular components of an imaging system, and a plurality of such modular components are disposed adjacent one another to provide a modular imaging system having greater pixel count than its component modules. FIG. 4 illustrates an embodiment of this third aspect of the invention.

FIG. 4 is a schematic diagram of a digital pixel sensor-based modular imaging system, the component modules of which comprise imaging systems of the type shown in FIG. 3. In FIG. 4, four modular imaging systems each comprising a die 300 and a die 306 are disposed on substrate 400 in a 2×2 array with their DPS arrays 302 adjacent one another to form a modular imaging system having four times the number of pixels of its component modules. As with the modular imaging system of FIG. 2, in order for the sampled areas of the image to be uniformly spaced, the pixel row and column spacing is desirably substantially uniform across the boundaries between adjacent dies 300.

Although the modular imaging system of FIG. 4 includes four dies 300, it should be understood that other numbers of component module dies 300 can be assembled into a modular imaging system in a similar manner. For instance, if only the upper left and upper right modular imaging systems each comprising a die 300 and a die 306 were affixed to substrate 400 to provide a 1×2 array, a modular imaging system would be formed with twice the pixel count of each component module. The 2×2 array shown in FIG. 4 can also be extended to form, for instance, 2×3 or 2×4 arrays with six and eight times k the pixel count, respectively, of the component modules. It should also be understood that a modular imaging system like that of FIG. 4 need not have one die 306 for each die 300, and that the control, processor, and I/O functions for a particular imaging system having a plurality of DPS array/frame buffer dies 300 may be performed by one or many integrated circuits. For instance, a pair of DPS array/frame buffer dies 300 could be serviced by a single control/processor/I/O die 306 to provide a modular imaging system whose component modules are maintained in a fixed spatial relationship by ta) substrate 500, as shown in FIG. 5.

Figure 6:
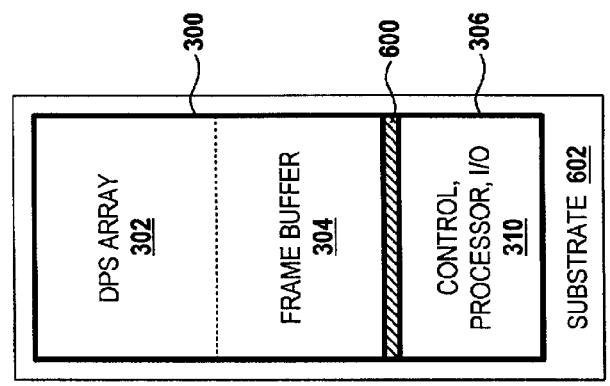
FIG. 6 is a schematic diagram of another digital pixel sensor-based modular imaging system, the component modules of which comprise a plurality of integrated circuit dies having differing functions.

FIG. 6 is a schematic diagram of another digital pixel sensor-based modular imaging system, the component modules of which comprise a plurality of integrated circuit dies having differing functions. The system of FIG. 6 is similar to that of FIG. 3, and elements in FIG. 6 that are identical to those in FIG. 3 are indicated by the same reference numbers. In FIG. 6, interconnections between die 300 and die 306 are effected by cutting them from the wafers in which they were fabricated, overlapping them at region of contact 600 (indicated in the drawing by hatching) and electrically and mechanically connecting the dies together at the region of contact. The module thus formed can then be affixed to substrate 602 and packaged. The region of overlap can extend to completely encompass one die so that the dies are stacked.

Figure 7:
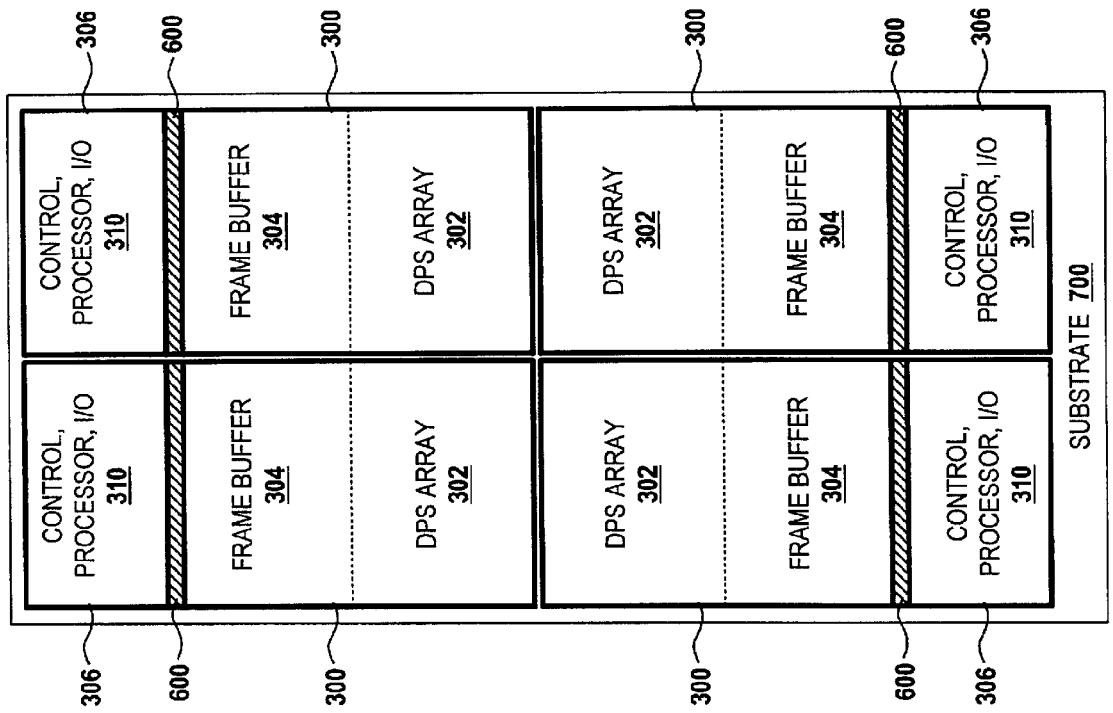
FIG. 7 is a schematic diagram of a digital pixel sensor-based modular imaging system, the component modules of which comprise imaging systems of the type shown in FIG. 6.

FIG. 7 is a schematic diagram of a digital pixel sensor-based modular imaging system, the component modules of which comprise imaging systems of the type shown in FIG. 6. In FIG. 7, four modular imaging systems, each comprising a die 300 and a die 306 that are overlapped and electrically and mechanically connected together, are affixed to substrate 700 in a 2×2 array with their DPS arrays 302 adjacent one another to form a modular imaging system having four times the number of pixels of its component modules. As with the modular imaging systems of FIGS. 2, 4, and 5, in order for the sampled areas of the image to be uniformly spaced, the pixel row and column spacing are desirably substantially uniform across the boundaries between adjacent dies 300.

Although the modular imaging systems of FIGS. 2, 4, and 7 are illustrated with component modules that are substantially identical, it should be understood that such systems might be constructed with some component modules that are different, for instance, having different numbers of pixels. It should also be understood that modular imaging systems might be constructed that include functions in addition to those described herein, and that such additional functions might be performed in modules of the type described herein or in other system components. It should also be understood that modular imaging systems might be constructed that omit certain circuitry described herein; in particular, although it is preferred to include processor circuitry as described, it can be omitted from systems according to the present invention. Moreover, circuitry such as the control circuitry and the I/O circuitry can be divided among several dies rather than included in the same die.

Except for connections between DPS array/frame buffer dies 300 and control, processor, and I/O tax dies 306, the dies comprising a modular imaging system can be substantially electrically independent of each other. For example, a system as in FIG. 2 can be made by fabricating dies 100 on a semiconductor substrate, without any direct electrical connection or communication between them and with the only electrical commonality being the common substrate. However, modular imaging systems can be made in °: which the dies have common electrical connections and/or communicate with each other.

In general, the present invention may be implemented for image sensors having one or more light-sensing elements arranged in either a one- or two-dimensional pattern, such as an array of elements t: arranged in rows and columns. It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. Imaging apparatus comprising a plurality of component modules disposed in a fixed spatial relationship, wherein:
   each of said component modules comprises at least one integrated circuit die;
   one or more of said component modules comprises an integrated circuit die having an array of digital pixel sensors and a frame buffer; and
   one or more of said component modules comprises an integrated circuit die having control circuitry and/or input/output circuitry.

2. The invention of claim 1, wherein a plurality of said component modules comprise an integrated circuit die having an array of digital pixel sensors.

3. The invention of claim 2, wherein said component modules that comprise an integrated circuit die having an array of digital pixel sensors are disposed in a spatial relationship in which the digital pixel sensor array of each such component module is adjacent the digital pixel sensor array of another component module.

4. The invention of claim 2, wherein said component modules are disposed so that all of the digital pixel sensors comprising said arrays have a substantially uniform spacing with respect to adjacent digital to pixel sensors.

5. The invention of claim 1, wherein a plurality of said integrated circuit dies are directly mechanically and electrically connected to each other.

6. The invention of claim 1, wherein a plurality of said integrated circuit dies comprise a single piece of semiconductor.

7. The invention of claim 1, wherein a plurality of said integrated circuit dies are separately affixed to a substrate.

8. The invention of claim 1, wherein a plurality of said component modules are substantially identical.

9. The invention of claim 1, wherein all of said component modules are substantially identical.

10. The invention of claim 1, wherein each digital pixel sensor comprises a photoresponsive element and an analog-to-digital converter which is responsive only to that photoresponsive element.

11. A method of making imaging apparatus comprising disposing a plurality of component modules in a fixed spatial relationship on a substrate, wherein:
   each of said component modules comprises at least one integrated circuit die;
   one or more of said component modules comprises an integrated circuit die having an array of digital pixel sensors and a frame buffer; and
   one or more of said component modules comprises an integrated circuit die having control circuitry and/or input/output circuitry.

12. The invention of claim 11, wherein a plurality of said component modules comprise an integrated circuit die having an array of digital pixel sensors.

13. The invention of claim 12, wherein said component modules that comprise an integrated circuit die having an array of digital pixel sensors are disposed in a spatial relationship in which the digital pixel sensor array of each such component module is adjacent the digital pixel sensor array of another component module.

14. The invention of claim 12, wherein said component modules are disposed so that all of the digital pixel sensors comprising said arrays have a substantially uniform spacing with respect to adjacent digital pixel sensors.

15. The invention of claim 11, wherein a plurality of said integrated circuit dies are directly mechanically and electrically connected to each other.

16. The invention of claim 11, wherein a plurality of said integrated circuit dies comprise a single piece of semiconductor.

17. The invention of claim 16, wherein said disposing step comprises fabricating said plurality of integrated circuit dies on a semiconductor wafer, further comprising the step of removing from said wafer a piece thereof that includes said plurality of integrated circuit dies.

18. The invention of claim 11, wherein a plurality of said integrated circuit dies are separately affixed to a substrate.

19. The invention of claim 11, wherein a plurality of said component modules are substantially identical.

20. The invention of claim 11, wherein a plurality of said component modules are substantially electrically independent of each other.

21. The invention of claim 11, wherein each digital pixel sensor comprises a photoresponsive element and an analog-to-digital converter which is responsive only to that photoresponsive element.

* * * * *